United States Patent [19]

Miyahara et al.

[11] Patent Number: 4,539,138

[45] Date of Patent: Sep. 3, 1985

[54] PHOSPHOR

[75] Inventors: Junji Miyahara; Takashi Nakamura; Kenji Takahashi, all of Minami-ashigara, Japan

[73] Assignee: Fuji Photo Film Co. Ltd., Kanagawa, Japan

[21] Appl. No.: 591,224

[22] Filed: Mar. 12, 1984

Related U.S. Application Data

[63] Continuation of Ser. No. 466,654, Feb. 15, 1983, abandoned, which is a continuation-in-part of Ser. No. 394,300, Jul. 1, 1982, abandoned, which is a continuation of Ser. No. 277,830, Jun. 26, 1981, abandoned, which is a continuation of Ser. No. 152,631, May 23, 1980, abandoned.

[30] Foreign Application Priority Data

May 25, 1979 [JP] Japan ................................. 54-64622

[51] Int. Cl.$^3$ ..................... C09K 11/46; C09K 11/465
[52] U.S. Cl. ....................... 252/301.4 H; 252/301.4 F
[58] Field of Search ................. 252/301.4 F, 301.4 H

[56] References Cited

U.S. PATENT DOCUMENTS

| | | | |
|---|---|---|---|
| 2,409,174 | 10/1946 | Dietz | 252/301.4 H |
| 3,448,056 | 6/1969 | Chenot | 252/301.4 H |
| 3,951,848 | 4/1976 | Wolfe et al. | 252/301.4 H |
| 4,057,508 | 11/1977 | Wolfe et al. | 252/301.4 H |

FOREIGN PATENT DOCUMENTS

| | | | |
|---|---|---|---|
| 896453 | 3/1972 | Canada | 252/301.4 H |
| 50-23387 | 3/1975 | Japan | 252/301.4 H |

Primary Examiner—Jack Cooper
Attorney, Agent, or Firm—Murray, Whisenhunt & Ferguson

[57] ABSTRACT

A rare earth element activated divalent metal represented by the formula

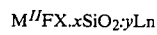

$M^{II}FX.xSiO_2:yLn$ wherein $M^{II}$ is at least one divalent metal selected from the group consisting of Ba, Ca, Sr, Mg, Zn and Cd; Ln is at least one rare earth element selected from the group consisting of Eu, Tb, Ce, Tm, Dy, Pr, Ho, Nd, Yb, Er, Sm and Gd; X is at least one halogen selected from the group consisting of Cl, Br and I; x and y are numbers satisfying the condition $5 \times 10^{-5} \leq x \leq 0.5$ and of $0 < y \leq 0.2$, respectively. This phosphor has improved characteristics such as the high luminance of emission, the high powder fluidity and good afterglow property.

3 Claims, 1 Drawing Figure

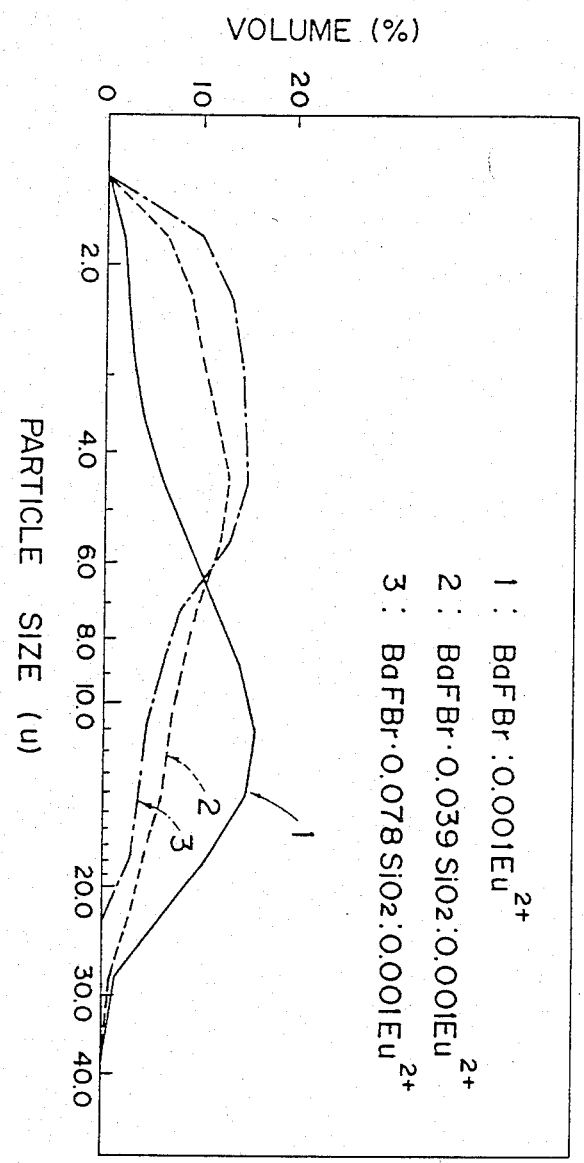

PHOSPHOR

CROSS-REFERENCE TO RELATED APPLICATIONS

This is a continuation of application Ser. No. 466,654, filed Feb. 15, 1983, which is a continuation in part of application Ser. No. 394,300, filed July 1, 1982, which is a continuation of application Ser. No. 277,830, filed June 26, 1981, which is a continuation of application Ser. No. 152,631, filed May 23, 1980, all now abandoned.

BACKGROUND OF THE INVENTION

1. Field of the Invention

This invention relates to a phosphor, and more particularly to a rare earth element activated divalent metal fluorohalide phosphor.

2. Description of the Prior Art

As one kind of fluorohalide phosphors, there has been known in the art a rare earth element activated divalent metal fluorohalide phosphor in which a fluorohalide compound of divalent metal as alkaline earth metal constitutes the host material and a rare earth element constitutes the activator. For example, Japanese Patent Publication No. 28591/1976 discloses a divalent europium activated divalent metal fluorohalide phosphor represented by the formula $$(Ba_{1-x-y-p},Sr_x,Ca_y,Eu^{2+}p)F(Cl_{1-a-b},Br_a,I_b)$$

wherein x, y, p, a and b are numbers satisfying the conditions of $x+y+p \leq 1$, $y \leq 0.20$, $0.001 \leq p \leq 0.20$ and $a+b \leq 1$. The phosphor emits light in the region of near ultraviolet rays having an emission peak in the neighbourhood of 390 nm under excitation of X-rays, ultraviolet rays, cathode rays, or the like. Since the phosphor has a high X-ray absorption efficiency and the emission spectrum thereof coincides with the spectral sensitivity of an X-ray film, the phosphor is practically used as a phosphor for a radiographic intensifying screen.

Such a rare earth element activated divalent metal fluorohalide phosphor as disclosed in the above-mentioned Japanese Patent Publication No. 28591/1976 can be obtained by firing a raw material mixture thereof at a temperature within the range of 600° to 1000° C. for a proper period of time. However, the phosphor is apt to sinter during the firing step. Accordingly, in the preparation of the phosphor, pulverization and classification of the phosphor must be conducted after the firing step, which results in not only complication of the preparation but also remarkable lowering of the yield of the phosphor. Further, it is well known in the art of phosphor preparation that the sintering of a phosphor generally affects the emission properties thereof, particularly the emission efficiency. Also in the rare earth element activated divalent metal fluorohalide phosphor, it seems that the sintering phenomenon during the firing step effects the emission efficiency of the phosphor.

As described in U.S. Pat. No. 4,080,306, the sintering phenomenon of the rare earth element activated divalent metal fluorohalide phosphor can be mitigated by adding a flux such as KCl, NaCl, LiCl, BaCl$_2$ and MgCl$_2$ to the raw material mixture of the phosphor. However, when the flux is used, the phosphor must be washed with water to remove the flux therefrom after the firing step. Therefore, a water washing step is needed instead of the pulverizing and classifying steps. Accordingly, although the period of time necessary for processing the phosphor can be shortened to some extent by using the flux, it is difficult to say that the preparation of the phosphor is simplified thereby. Further, since the rare earth element activated divalent metal fluorohalide has a relatively high solubility in water, the phosphor dissolves in a water together with the flux during the water washing step and therefore, the yield of the phosphor lowers. From this viewpoint also, the use of the flux is not desirable.

Further, since the rare earth element activated divalent metal fluorohalide phosphor is hygroscopic, the fluidity of the phosphor as a powder is low and the phosphor has a defect that it is apt to agglomerate. Accordingly, in the practical use of the phosphor, the handling thereof is frequently troublesome due to the agglomeration.

Furthermore, the afterglow property of the rare each element activated divalent metal fluorohalide phosphor is not satisfactory from the viewpoint of the practical use thereof. That is, the decay of the afterglow of the phosphor is relatively low.

As described above, the rare earth element activated divalent metal fluorohalide is nowadays popularly used in the radiographic intensifying screens. Therefore, the above-mentioned defects of the phosphor are serious problems in both the cost of preparation of the phosphor and the properties thereof, and it is desired to solve the problems.

SUMMARY OF THE INVENTION

In view of the above, an object of the present invention is to provide a rare earth element activated divalent metal fluorohalide phosphor which does not sinter during the firing step and accordingly, can be economically prepared with high yield without the pulverizing and classifying steps after the firing step.

Another object of the present invention is to provide a rare earth element activated divalent metal fluorohalide phosphor which emits light of improved luminance.

A further object of the present invention is to provide a rare earth element activated divalent metal fluorohalide phosphor which has a high powder fluidity.

Still another object of the present invention is to provide a rare earth element activated divalent metal fluorohalide phosphor which has a good afterglow property.

In order to accomplish the above-mentioned objects, the inventors conducted various investigations in the rare earth element activated divalent metal fluorohalide phosphor represented by the formula $$M^{II}FX:yLn$$

wherein $M^{II}$ is at least one divalent metal selected metal selected from the group consisting of Ba, Ca, Sr, Mg, Zn and Cd; Ln is at least one rare earth element selected from the group consisting of Eu, Tb, Ce, Tm, Dy, Pr, Ho, Nd, Yb, Er, Sm and Gd; X is at least one halogen selected from the group consisting of Cl, Br and I; and y is a number satisfying the condition of $0 < y \leq 0.2$. As a result of investigations, it was found that the sintering of the above-mentioned rare earth element activated divalent metal fluorohalide phosphor during the firing step was prevented and accordingly, the phosphor was prepared with high yield without the pulverizing and classifying step after the firing step by adding a specified compound to the raw material mixture of the phosphor and incorporating the compound in the phosphor. Also, it was found the resulting phosphor emitted light of higher luminance, had a higher powder fluidity and had a better afterglow property in comparison with the conventional one.

The rare earth element activated divalent metal fluorohalide phosphor of the present invention is presented by the formula $$M^{II}FX \cdot xSiO_2:yLn$$

wherein $M^{II}$ is at least one divalent metal selected from the group consisting of Ba, Ca, Sr, Mg, Zn and Cd; Ln is at least one rare earth element selected from the group consisting of Eu, Tb, Ce, Tm, Dy, Pr, Ho, Nd, Yb, Er, Sm and Gd; X is at least one halogen selected from the group consisting of Cl, Br and I; and x and y are numbers satisfying the conditions of $5 \times 10^{-5} \leq x \leq 0.5$ and $0 < y \leq 0.2$, respectively.

BRIEF DESCRIPTION OF THE DRAWING

The single FIGURE is a graph showing the particle size distribution of the phosphor of the present invention (curves 2 and 3) in comparison with that of the conventional phosphor (curve 1).

DETAILED DESCRIPTION OF THE INVENTION

The present invention will be described in detail hereinbelow.

The rare earth element activated divalent metal fluorohalide phosphor of the present invention is prepared by the following process.

The following raw materials are used:
(i) at least one divalent metal fluoride selected from the group consisting of $BaF_2$, $CaF_2$, $SrF_2$, $MgF_2$, $ZnF_2$ and $CdF_2$,
(ii) a halogen donator containing at least one halogen selected from the group consisting of Cl, Br and I,
(iii) a raw material of activator which is at least one rare earth element compound selected from the group consisting of Eu compounds, Tb compounds, Ce compounds, Tm compounds, Dy compounds, Pr compounds, Ho compounds, Nd compounds, Yb compounds, Er compounds, Sm compounds and Gd compounds,
(iv) a raw material $SiO_2$ which is at least one of $SiO_2$ or Si compound which is easily converting to $SiO_2$ at a high temperature.

The halogen donator (ii) donates at least one halogen selected from the group consisting of Cl, Br and I which is one of constituents of the phosphor of the present invention. As the halogen donator, a halide other than fluoride (viz., chloride, bromide and iodide) of Ba, Ca, Sr, Mg, Zn or Cd (divalent metal halide), an ammonium salt of halogen other than fluorine (viz., $NH_4Cl$, $NH_4Br$ and $NH_4I$), and the like can be employed. When the divalent metal halide is employed as the halogen donator, the halogen donator donates not only at least one halogen selected from the group consisting of Cl, Br and I but also a part of the divalent metal which is the other constituent of the phosphor of the present invention. That is, when the halogen donator employed is not the divalent metal halide, the divalent metal which is one of the constituents of the phosphor obtained in donated only by the above-mentioned divalent metal fluoride (i). However, when the halogen donator employed is the divalent metal halide, the divalent metal which is one of the constituents of the phosphor obtained is donated by both the divalent metal fluoride (i) and the halogen donator (ii).

As the Eu compound, Tb compound, Ce compound, Tm compound, Dy compound, Pr compound, Ho compound, Nd compound, Yb compound, Er compound, Sm compound and Gd compound which are employed as the raw material of activator (iii) can be employed oxide, halide, nitrate, carbonate, sulfate, and the like. Although the rare earth element compound may be employed in the form of a solid, it is preferably employed in the form of a solution so as to disperse in the raw material mixture uniformly. The solution of the rare earth element compound can easily be prepared by dissolving the rare earth element compound in an acid such as HCl, HBr, $HNO_3$, and the like.

The raw material of $SiO_2$ (iv) prevents the sintering of the phosphor during the firing step. Further, the raw material of metal oxide remains in the phosphor obtained as a metal oxide and improves the luminance of emission, the powder fluidity and the afterglow property of the phosphor.

Si compounds which are easily converting to the $SiO_2$ at a high temperature can be employed as raw material of $SiO_2$. For example, as the compounds which are easily converting to $SiO_2$, can be employed compounds such as nitrate, carbonate, sulfate, hydroxide, and the like which are easily decomposable into the metal oxides at a high temperature. The raw material of $SiO_2$ should preferably be fine particles having a mean particle size within the range of 10 to 1000 Å. When the mean particle size is less than 10 Å, particles of the raw material of metal oxide are apt to agglomerate each other and therefore, it is difficult to obtain a raw material mixture in which the raw material of $SiO_2$ disperses uniformly. On the other hand, when the mean particle size is more than 1000 Å, the effects obtained in accordance with the present invention such as the sintering prevention effect becomes low. More preferably, the raw material of $SiO_2$ has a mean particle size within the range of 30 to 700 Å, most preferably within the range of 50 to 500 Å.

Then, a raw material mixture stoichiometrically represented by the following formula is prepared by using the above-mentioned raw materials (i), (ii), (iii) and (iv):

$$M^{II}FX \cdot xSiO_2:yLn$$

wherein $M^{II}$ is at least one divalent metal selected from the group consisting of Ba, Ca, Sr, Mg, Zn and Cd; Ln is at least one rare earth element selected from the group consisting of Eu, Tb, Ce, Tm, Dy, Pr, Ho, Nd, Yb, Er, Sm and Gd; X is at least one halogen selected from the group consisting of Cl, Br and I; and x and y are numbers satisfying the conditions of $5 \times 10^{-5} \leq x \leq 0.5$ and $0 < y \leq 0.2$.

From the viewpoint of the sintering prevention effect during the firing step, and the properties of the phosphor like the luminance of emission and the powder fluidity, and x value of the above-mentioned formula is preferably within the range of $10^{-5} \leq x \leq 0.3$, more preferably within the range of $10^{-4} \leq x \leq 0.2$. It is needless to say that in the above-mentioned formula, when the Ln consists of more than one rare earth element selected from the above-mentioned group, the y value represents the total of the number of moles of those rare earth elements.

The raw material mixture may be prepared (I) by simply mixing the divalent metal fluoride (i), the halogen donator (ii), the raw material of activator (iii) and the raw material of SiO$_2$ (iv), or (II) by producing beforehand a divalent metal fluorohalide represented by the following formula by using the divalent metal fluoride (i) and the halogen donator (ii), and then, mixing the raw material of activator (iii) and the raw material of SiO$_2$ (iv) with the divalent metal fluorohalide:

$$M^{II}FX$$

wherein $M^{II}$ is at least one divalent metal selected from the group consisting of Ba, Ca, Sr, Mg, Zn and Cd, and X is at least one halogen selected from the group consisting of Cl, Br and I, or (III) by causing the divalent metal fluoride (i) to react with the halogen donator (ii) in the presence of the raw material of activator (iii) and the raw material of SiO$_2$ (iv) to produce the above-mentioned type of divalent metal fluorohalide already mixed with the raw material of activator (iii) and the raw material of SiO$_2$ (iv).

Among the above-described three processes for preparing the raw material mixture, the second and the third processes generally give a better result in comparison with the first process. In the second and the third processes, various methods can be utilized, respectively, to produce the divalent metal fluorohalide by using the divalent metal fluoride and the halogen donator; and to produce the divalent metal fluorohalide already mixed with the raw material of activator and the raw material of SiO$_2$ by using the divalent metal fluoride, the halogen donator, the raw material of activator and the raw material of SiO$_2$. For example, the divalent metal fluorohalide and the divalent metal fluorohalide mixed with the raw material of activator and the raw material of SiO$_2$ can easily be produced, respectively, by mixing the divalent metal fluoride and the above-mentioned divalent metal halide (halogen donator); and the divalent metal fluoride, the divalent metal halide, the raw material of activator and the raw material of SiO$_2$ to obtain a mixture, and then, heating the mixture at a temperature of not less than 100° C. for several hours (dry method). Also, the divalent metal fluorohalide and the divalent metal fluorohalide mixed with the raw material of activator and the raw material of SiO$_2$ can easily be produced, respectively, by adding the solution of the divalent metal halide; and the solution of the divalent metal halide, the raw material of activator and the raw material of SiO$_2$ to the suspension of the divalent metal fluoride, and then, stirring thoroughly the resultant mixture to cause the divalent metal fluoride to react with the divalent metal halide (wet method). The raw material mixture obtained in accordance with the above-mentioned third process is a homogeneous mixture of the divalent metal fluorohalide, the raw material of activator and the raw material of SiO$_2$. When the raw material mixture is prepared in accordance with the above-mentioned second process, in both the dry method and the wet method, a homogeneous mixing of the divalent metal fluorohalide and the raw material of activator can be attained simultaneously with the production of the divalent metal fluorohalide by causing the raw material of activator to exist in the reaction system.

In the first and the second processes for preparing the raw material mixture, the divalent metal fluoride, the halogen donator, the raw material of activator and the raw material of SiO$_2$; and the divalent metal fluorohalide, the raw material of activator and the raw material of SiO$_2$ are mixed thoroughly to obtain the raw material mixture. The mixing is performed by means of the conventional mixing machine such as a stirring machine having a stirring blade, a twin-cylinder mixer, a ball mill, a rod mill, or the like. When the raw material of activator is employed in the form of a solution, it is desirable to dry beforehand the weighed out raw materials containing the solution of the raw material of activator, and then, perform the above-mentioned mixing.

As described hereinabove, the raw material of SiO$_2$ is preferably a fine particle having a mean particle size within the range of 10 to 1000 Å. It is also desirable that the raw material mixture absent the raw material of SiO$_2$ has a relatively small mean particle size. The raw material mixture absent the raw material of SiO$_2$ generally employed has a mean particle size within the range of about 1 to 100μ. Accordingly, when the mean particle size of the raw material mixture absent the raw material of SiO$_2$ is more than about 100μ, it is desirable that the mixture is pulverized and as the case may be, is classified beforehand so that it has a mean particle size within the above-mentioned range. The pulverization of the raw material mixture absent the raw material of SiO$_2$ is performed by means of the conventional pulverizer such as a mortar, a ball mill, a tube mill, a centrifugal mill, or the like. Alternatively, the raw material mixture containing the raw material of SiO$_2$ may be pulverized. When the raw material mixture containing the raw material of SiO$_2$ is pulverized, the pulverization can serve for mixing the raw material mixture. Further, the raw material mixture prepared in accordance with the above-mentioned third process may be pulverized.

The raw material mixture obtained has a markedly high powder fluidity in comparison with the raw material mixture used in the preparation of the conventional rare earth element activated divalent metal fluorohalide phosphor (viz., the raw material mixture absent the raw material of metal oxide). It is likely that the hygroscopicity inherent in the conventional raw material mixture is mitigated by the inclusion of the raw material of SiO$_2$ and hence, the powder fluidity of the raw material mixture is improved. Since the powder fluidity of the raw material mixture is improved, the handling of the raw material mixture before the firing step described hereinafter such as charging of the raw material mixture into a heat resistant container can be performed very easily. The improvement of the power fluidity of the raw material mixture is also one of the advantages of the present invention.

Then, the above-mentioned raw material mixture is charged in a heat resistant container such as an alumina crucible, a quartz crucible, a quartz boat, or the like, and fired in a firing furnace. The firing may be performed in any one of an ambient atmosphere (oxidizing atmosphere), a reducing atmosphere and an inert atmosphere. However, since the phosphor is apt to be oxidized when the firing is performed in an ambient atmosphere, the firing is preferably performed in a reducing atmosphere, or in an inert atmosphere. As a reducing atmosphere, a nitrogen gas atmosphere containing not more than 10 volume % of hydrogen gas, a carbon vapor atmosphere, or the like can be employed. As an inert atmosphere, a nitrogen gas atmosphere, an argon gas atmosphere, or the like can be employed. Among the phosphors included in the rare earth element activated divalent metal fluorohalide phosphor of the present invention, the phosphor activated with divalent Eu is very useful practically. In the preparation of the phosphor, a compound of trivalent Eu is employed as a raw material of activator, and the trivalent Eu is reduced to divalent Eu during the firing. Accordingly, when the phosphor activated with divalent Eu is prepared, the firing should be performed in a reducing atmosphere.

Although the firing temperature is determined depending upon the kind of the raw material mixture (that is, the kind of the phosphor to be obtained) and so forth, similarly to the firing temperature in the conventional process the firing temperature is generally within the range of 600° to 1000° C., preferably within the range of 700° to 950° C. Although the firing period is determined depending on the kind of the raw material mixture, the amount of the raw material mixture charged in the heat resistant container, and the firing temperature employed for instance, the firing period is generally within the range of 30 minutes to 48 hours, preferably within the range of 1 to 12 hours. The luminance of emission of the phosphor of the present invention can further be enhanced by firing the raw material mixture under the firing conditions mentioned above, taking out the fired product from the furnace, mixing up the fired product and then refiring the mixed up fired product under the same firing conditions.

By the above-mentioned firing, the phosphor of the present invention is produced from the raw material mixture. Because of the sintering prevention effect of the raw material of $SiO_2$ contained in the raw material mixture, the phosphor obtained does not sinter unlike the conventional phosphor and is powdery. Accordingly, differently from the conventional sintered phosphor, it is unnecessary for the phosphor obtained to be subjected to pulverization and classification after the firing, and the phosphor obtained can be used in various applications as it is or after it is classified. As described above, in the process of the present invention, the pulverizing and classifying steps after the firing step can be omitted. Accordingly, in accordance with the process of the present invention, the preparation of the rare earth element activated divalent metal fluorohalide phosphor can be simplified, and the phosphor can be obtained with high yield. Further, as described hereinafter, the phosphor obtained in accordance with the process of the present invention exhibits better properties than the conventional phosphor.

The rare earth element activated divalent metal fluorohalide phosphor of the present invention prepared in accordance with the above-mentioned process is represented by the formula

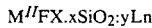

$M^{II}FX \cdot xSiO_2:yLn$ wherein $M^{II}$ is at least one divalent metal selected from the group consisting of Ba, Ca, Sr, Mg, Zn and Cd; Ln is at least one rare earth metal element selected from the group consisting of Eu, Tb, Ce, Tm, Dy, Pr, Ho, Nd, Yb, Er, Sm and Gd; X is at least one halogen selected from the group consisting of Cl, Br and I; and x and y are numbers satisfying the conditions of $5 \times 10^{-5} \leq x \leq 0.5$ and $0 < y \leq 0.2$. That is, the phosphor of the present invention is a phosphor wherein $SiO_2$ in the above-mentioned formula is incorporated in the conventional rare earth element activated divalent metal fluorohalide phosphor. The phosphor of the present invention emits light of higher luminance than the conventional phosphor which does not contain $SiO_2$ under excitation of X-rays, ultraviolet rays, cathode rays, or the like.

The reason for the improvement of luminance of emission observed in the phosphor of the present invention seems to be partly due to the fact that the raw material of $SiO_2$ contained in the raw material mixture suppresses the sintering of the phosphor during the firing step, thereby the lowering of the emission efficiency of the phosphor caused by the sintering is prevented. However, in view of the marked improvement of luminance of emission (3 to 4 times of the conventional phosphor), it is supposed that the improvement of luminance of emission observed in the phosphor of the present invention is not merely due to the sintering prevention effect of the raw material of $SiO_2$ during the firing step, and that $SiO_2$ remaining in the phosphor as a constituent thereof probably contributes to the emission mechanism of the phosphor and enhances the emission efficiency of the phosphor. The emission spectrum of the phosphor of the present invention is essentially the same as that of the conventional phosphor which does not contain $SiO_2$.

Further, the hygroscopicity of the phosphor of the present invention is mitigated by $SiO_2$ which is a constituent of the phosphor, and therefore, the powder fluidity of the phosphor of the present invention is higher than the conventional phosphor which does not contain $SiO_2$. Accordingly, when the phosphor of the present invention is used in various applications, the handling thereof is remarkably easier than the conventional phosphor.

Furthermore, the phosphor of the present invention exhibits better afterglow property than the conventional phosphor which does not contain $SiO_2$. That is, the decay of the afterglow of the phosphor of the present invention is faster than the conventional phosphor. It seems that when the raw material mixture of the phosphor is prepared by the above-mentioned wet method, the phosphor exhibits particularly good afterglow property.

Among the phosphors included in the rare earth element activated divalent metal fluorohalide phosphor of the present invention, the divalent Eu activated alkaline earth metal fluorohalide phosphor in which the divalent metal ($M^{II}$ of the above-mentioned formula) is at least one alkaline earth metal selected from the group consisting of Ba, Ca and Sr, and the activator (Ln of the above-mentioned formula) is divalent Eu is particularly useful practically. The amount of $SiO_2$ (x of the above-mentioned formula) is preferably within the range of $10^{-5}$ to 0.3 moles, more preferably within the range of $10^{-4}$ to 0.2 moles per one mole of the divalent metal fluorohalide ($M^{II}FX$ of the above-mentioned formula).

As described hereinabove, in accordance with the process for preparing a rare earth element activated divalent metal fluorohalide phosphor of the present invention, sintering of the phosphor during the firing can be prevented, and therefore, the pulverizing and classifying steps after the firing step can be omitted. Accordingly, in accordance with the process of the present invention, the preparation of the rare earth element activated divalent metal fluorohalide phosphor can be simplified, the yield of the phosphor can be increased, and therefore, the phosphor can be obtained at low cost. Further, in comparison with the process in which a flux is used, the process of the present invention has the advantages that the water washing step is not needed, and that the yield of the phosphor is high. The rare earth element activated divalent metal fluorohalide phosphor of the present invention emits light of higher luminance than the conventional phosphor. Further, the phosphor of the present invention exhibits higher powder fluidity than the conventional phosphor. Furthermore, the phosphor of the present invention exhibits better afterglow property than the conventional phosphor. As described above, in accordance with the present invention, the cost for preparing the rare earth element activated divalent metal fluorohalide phosphor can be lowered, and the properties of the phosphor can be improved.

The present invention will hereinbelow be described referring to several examples.

EXAMPLE 1

87.68 grams of guaranteed reagent $BaF_2$ (manufactured by Morita Kagaku Co., Ltd.) and 122.16 grams of guaranteed reagent $BaCl_2.2H_2O$ (manufactured by Kanto Kagaku Co., Ltd.) were weighed out, and pulverized and mixed thoroughly for 30 minutes by means of an agate mortar to obtain a mixture. Then, the mixture was heated at a temperature of 150° C. for 2 hours to produce BaFCl. Thereafter, guaranteed reagent $Eu_2O_3$ (manufactured by Wako Junyaku Co., Ltd.) dissolved in HCl was added to the BaFCl in a stoichiometric ratio than the amount of Eu was $10^{-2}$ gram atoms per 1 mole of the BaFCl, and mixed thoroughly therewith to obtain a slurry. The slurry obtained was heated and dried at a temperature of 130° C. for 2 hours in a depressurized atmosphere, and then pulverized and mixed up for 2 hours by means of an automatic mortar made of alumina of high purity (GRINDOMAT, manufactured by RETSCH-MÜHLE Co., Ltd.) to obtain a mixture of $EuCl_3$ and BaFCl.

Then, 0.032 moles of $SiO_2$ fine particles of high purity having a mean particle size of 70 Å (manufactured by Nippon Aerosil Co., Ltd.) was added to mixture of BaFCl and $EuCl_3$ in the indicated amount per 1 mole of the BaFCl, and mixed therewith for 30 minutes by means of a mixer (TURBULA, manufactured by Willy A. Bachofen Co., Ltd.) operated at a speed of 90 r.p.m. to prepare six kinds of raw material mixtures.

The raw material mixtures thus prepared had very high powder fluidity, and in these raw material mixture, agglomeration of particles was not observed.

By using the raw material mixtures, phosphor of the present invention was prepared as follows.

20 grams of the raw material mixture was put into a quartz boat and fired in a tube furnace. The firing was performed in a nitrogen gas stream of a flow rate of 280 ml/min containing 1 volume % of a hydrogen gas at a temperature of 900° C. for 4 hours. After the firing, the quartz crucible was taken out from the tube furnace, allowed to stand and cooled to a room temperature.

In phosphor thus prepared, sintering was not observed, and these phosphor was powdery similarly to the raw material mixture thereof.

For the purpose of comparison, the conventional phosphor was prepared by firing the mixture of BaFCl and $EuCl_3$ in the same manner as described above. Since the phosphor was sintered during the firing, after the firing it was pulverized for 30 minutes by means of the above-mentioned automatic mortar.

Then, the phosphor of the present invention and the conventional phosphor thus obtained (referred to as "Sample 1" and "Reference sample", respectively) were classified by use of sieves of 325 and 400 mesh to obtain powders having a particle size corresponding to the mesh between 325 mesh and 400 mesh.

Thereafter, the luminance of emission and the powder fluidity (angle of repose) of the seven kinds of phosphors were measured. The result of the measurement is shown in Table 1 below.

TABLE 1

| Sample No. | Formula of Phosphor | *Luminance of Emission | Powder Fluidity (Angle of Repose) |
| --- | --- | --- | --- |
| Reference | $BaFCl.0.01Eu^{2+}$ | 100 | 50° |
| 1 | $BaFCl.0.032SiO_2:0.01Eu^{2+}$ | 300 | 42° |

*The luminance of emission is represented by a relative value with reference to that of Reference sample defined to be 100. The sample was excited by X-ray of 80 KVp and 250 mA emitted by an X-ray source located at the distance of 180 cm from the sample.

As is clear from Table 1, the phosphor of the present invention (Sample 1) exhibits higher luminance of emission and higher powder fluidity than the conventional phosphor (Reference sample).

Further, the yield of Sample 1 and Reference sample was obtained. That is, these samples were classified by use of a sieve of 325 mesh to obtain powders which pass through the sieve, and the weight ratios of the powders thus classified to the whole samples before the classification were obtained respectively for the two samples. Regarding Reference sample, the yield was obtained for both the sample which was subjected to the above-mentioned pulverization after the firing and the sample which was not subjected thereto. The result is shown in Table 2 below.

TABLE 2

| Sample No. | Pulverization after Firing | Yield (Weight %) |
| --- | --- | --- |
| 1 | non | 85 |
| Reference | non | nearly zero |
| Reference | pulverized | 14 |

As is clear from Table 2, in accordance with the process of the present invention, the phosphor can be obtained with a higher yield than that attained in accordance with the conventional process.

EXAMPLE 2

78.91 grams of guaranteed reagent $BaF_2$ (manufactured by Morita Kagaku Co., Ltd.), 6.28 grams of guaranteed reagent $SrF_2$ (manufactured by Morita Kagaku Co., Ltd.) and 122.61 grams of $BaCl_2.2H_2O$ (manufactured by Kanto Kagaku Co., Ltd.) were weighed out, and pulverized and mixed thoroughly for 30 minutes by means of an agate mortar to obtain a mixture. Then, the mixture obtained was heated at a temperature of 150° C. for 2 hours to produce $(Ba_{0.9},Sr_{0.1})FCl$. Thereafter, guaranteed reagent $Eu_2O_3$ (manufactured by Wako Junyaku Co., Ltd.) dissolved in HCl was added to the $(Ba_{0.9},Sr_{0.1})FCl$ in a stoichiometric ratio that the amount of Eu was $10^{-2}$ gram atoms per 1 mole of the $(Ba_{0.9},Br_{0.1})FCl$, and mixed thoroughly therewith to obtain a slurry. The slurry obtained was heated and dried at a temperature of 130° C. for 2 hours in a depressurized atmosphere, and then pulverized and mixed up for 2 hours by means of the same automatic mortar as described in Example 1 to obtain a mixture of $(Ba_{0.9},Sr_{0.1})FCl$ and $EuCl_3$.

Then, the same $SiO_2$ particle as described in Example 1 was added to mixture $(Ba_{0.9},Sr_{0.1})FCl$ and $EuCl_3$ in the same amount as described in Example 1, and mixed therewith in the same manner as described in Example 1 to prepare raw material mixture.

The raw material mixture thus prepared had very high powder fluidity, and in these raw material mixture, agglomeration of particles was not observed.

Then, by firing the above raw material mixture in the same manner as described in Example 1, phosphor of the present invention represented by the formula $(Ba_{0.9},Sr_{0.1})FCl.0.032SiO_2:0.01Eu^{2+}$, was prepared.

In phosphor thus prepared, sintering was not observed, and the phosphor was powdery.

Similarly to the phosphor of the present invention described in Example 1, the phosphor exhibited high luminance of emission and high powder fluidity. Further, the phosphor was able to be classified by use of a sieve with a remarkable high yield.

EXAMPLE 3

87.68 grams of guaranteed reagent $BaF_2$ (manufactured by Morita Kagaku Co., Ltd.) and 166.6 grams of guaranteed reagent $BaBr_2.2H_2O$ (manufactured by Kanto Kagaku Co., Ltd.) were weighed out, and pulverized and mixed thoroughly for 30 minutes by means of an agate mortar to obtain a mixture. Then, the mixture obtained was heated at a temperature of 150° C. for 2 hours to produce BaFBr. Thereafter, guaranteed reagent $Eu_2O_3$ (manufactured by Wako Junyaku Co., Ltd.) dissolved in HBr and guaranteed reagent $Sm_2O_3$ (manufactured by Wako Junyaku Co., Ltd.) dissolved in HBr were added to the BaFBr in such a stoichiometric ratio that both the amount of Eu and the amount of Sm were $10^{-3}$ gram atoms per 1 mole of the BaFBr, and mixed thoroughly therewith to obtain a slurry. The slurry obtained was heated and dried at a temperature of 130° C. for 2 hours in a depressurized atmosphere, and then pulverized and mixed up for 2 hours by means of the same automatic mortar as described in Example 1 to obtain a mixture of BaFBr, $EuBr_3$ and $SmBr_3$.

Then, $SiO_2$ particle as described in Example 1 was added to mixture of BaFBr, $EuBr_3$ and $SmBr_3$ in the same amount as described in Example 1, and mixed therewith in the same manner as described in Example 1 to prepare raw material mixture.

The raw material mixture thus prepared had very high powder fluidity, and in these raw material mixture, agglomeration of particles was not observed.

Then, by firing the above raw material mixture in the same manner as described in Example 1, phosphor of the present invention represented by the formulae $BaFBr0.032SiO_2:0.001Eu^{2+}$, 0.001Sm, was prepared.

In this phosphor thus prepared, sintering was not observed, and the phosphors were powdery.

Similarly to the phosphor of the present invention described in Example 1, the phosphor exhibited high luminance of emission and high powder fluidity. Further, the phosphor was able to be classified by means of a sieve with a remarkable high yield.

EXAMPLE 4

166.6 grams of guaranteed reagent $BaBr_2.2H_2O$ (manufactured by Kanto Kagaku Co., Ltd.) were dissolved in 300 ml of distilled water to obtain an aqueous solution of $BaBr_2.2H_2O$. Then, guaranteed reagent $Eu_2O_3$ (manufactured by Wako Junyaku Co., Ltd.) dissolved in HBr was added to the solution in a stoichiometric ratio that the amount of Eu was $2\times10^{-3}$ gram atoms per 1 mole of the $BaBr_2.2H_2O$ to obtain a solution containing $BaBr_2.2H_2O$ and $EuBr_3$. Thereafter, three kinds of suspensions were prepared by adding $SiO_2$ fine particles of high purity having a mean particle size of 70 Å (manufactured by Nippon Aerosil Co., Ltd.) separately to the solutions in an amount of 0, 0.078 and 0.156 moles, respectively, per 1 mole of the $BaBr_2.2H_2O$ and suspending the $SiO_2$ fine particles therein, and then adding 87.68 grams of guaranteed reagent $BaF_2$ having a mean particle size of $4\mu$ (manufactured by Morita Kagaku Co., Ltd.) to the solutions and suspending the $BaF_2$ reagent therein. The resultant three kinds of suspensions were heated at a temperature of 60° C. with stirring, dried in a depressurized atmosphere, and then further heated and dried at a temperature of 130° C. for 2 hours in the depressurized atmosphere to obtain a cake. The resultant three kinds of cakes were disintegrated into powders to obtain raw material mixtures.

Among the three kinds of raw material mixtures thus prepared, the two kinds of raw material mixtures other than the raw material mixture absent the $SiO_2$ had very high powder fluidity, and in these two kinds of raw material mixtures, agglomeration of particles was not observed.

Then, by firing the above three kinds of raw material mixtures in the same manner as described in Example 1 except for firing the raw material mixtures for one hour, three kinds of phosphors represented by the formulae $BaFBr:0.001Eu^{2+}$, $BaFBr.0.039SiO_2:0.001Eu^{2+}$ and $BaFBr.0.078SiO_2:0.001Eu^{2+}$, respectively, were prepared (referred to as "Reference sample", "Sample 1" and "Sample 2", respectively). In Samples 1 and 2, sintering was not observed. Further, Samples 1 and 2 were powdery. On the other hand, since Reference sample was sintered during the firing, after the firing it was pulverized for 30 minutes by means of the same automatic mortar as described in Example 1.

Then, Reference Sample and Samples 1 and 2 were classified by use of a sieve of 400 mesh to obtain respective powders which pass through the sieve.

The particle size distribution of the powders obtained was measured by mean of a particle size distribution measuring device (Coulter Counter TAII, manufactured by Coulter Electronics, Inc.). The result is shown in the drawing appended herewith.

Further, the luminance of emission of the powders was measured in the same manner as described in Example 1. Furthermore, the luminance of afterglow of the powders was measured 30 seconds after the stoppage of the excitation of the powders. The result of these measurements is shown in Table 3 below.

TABLE 3

| Sample No. | Formula of Phosphor | *Luminance of Emission | **Luminance of Afterglow |
|---|---|---|---|
| Reference | $BaFBr.0.001Eu^{2+}$ | 100 | 0.033 |
| 1 | $BaFBr.0.039SiO_2:0.001Eu^{2+}$ | 145 | 0.0065 |
| 2 | $BaFBr.0.078SiO_2:0.001Eu^{2+}$ | 105 | 0.0044 |

*The luminance of emission is represented by a relative value with reference to that of Reference sample defined to be 100.
**The luminance of afterglow is represented by a relative value with reference to the luninance of emission during the excitation of the phosphor defined to be 100.

As is clear from the drawing and Table 3, the phosphors of the present invention (Samples 1 and 2) exhibit higher luminance of emission than the conventional phosphor (Reference sample) though the mean particle size of the former is smaller than the latter (the mean particle size of the former is almost the same as that of the $BaF_2$ employed in the raw material mixture thereof).

Further, as is clear from Table 3, the decay of afterglow of the phosphors of the present invention is remarkably faster than the conventional phosphor. That is, the phosphors of the present invention exhibit better afterglow property than the conventional phosphor.

Furthermore, the phosphors of the present invention exhibited higher powder fluidity than the conventional phosphor.

Furthermore, the phosphors of the present invention were able to be classified by use of a sieve with a remarkable high yield.

We claim:

1. A rare earth element activated divalent metal fluorohalide phosphor represented by the formula $$M^{II}FX.xSiO_2:yLn$$

wherein $M^{II}$ is at least one divalent metal selected from the group consisting of Ba, Ca, Sr, Mg, Zn and Cd; Ln is at least one rare earth element selected from the group consisting of Eu, Tb, Ce, Tm, Dy, Pr, Ho, Nd, Yb, Er, Sm and Gd; X is at least one halogen selected from the group consisting of Cl, Br and I; and x and y are numbers satisfying the conditions of $10^{-5} \leq x \leq 0.3$ and $0 < y \leq 0.2$, respectively, and exhibiting a faster decay of afterglow than said phosphor, absent $SiO_2$.

2. A phosphor as defined in claim 1 wherein said x is a number satisfying the condition of $10^{-4} \leq x \leq 0.2$.

3. A phosphor as defined in claim 1 wherein said $M^{II}$ is at least one divalent metal selected from the group consisting of Ba, Ca and Sr, and said Ln is divalent Eu.

* * * * *